A. ENGEL.
MULTIPLE MIXING VALVE.
APPLICATION FILED JUNE 4, 1918.
1,313,590.
Patented Aug. 19, 1919.
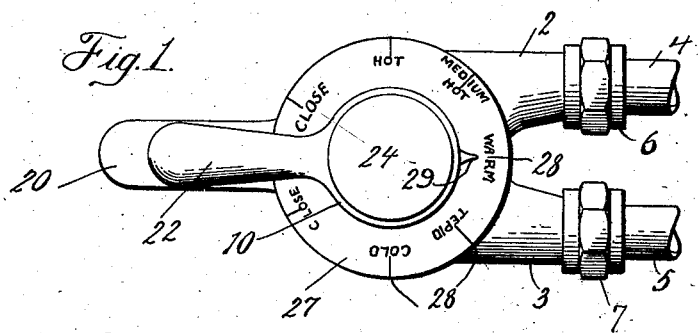
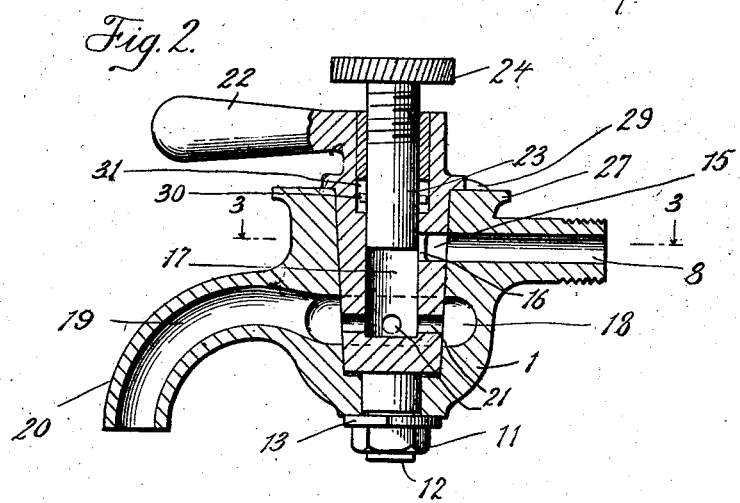
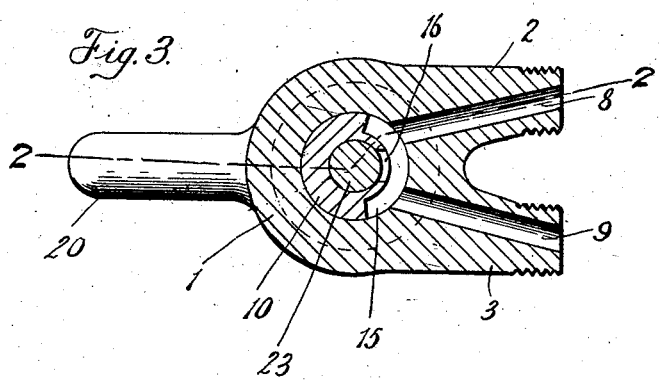
Inventor
Abraham Engel,
By William D. Richards
Attorney

UNITED STATES PATENT OFFICE.

ABRAHAM ENGEL, OF NEW YORK, N. Y.

MULTIPLE MIXING-VALVE.

1,313,590. Specification of Letters Patent. Patented Aug. 19, 1919.

Application filed June 4, 1918. Serial No. 238,098.

*To all whom it may concern:*

Be it known that I, ABRAHAM ENGEL, a citizen of Russia, and resident of New York city, in the county of New York and State of New York, have invented certain new and useful Improvement in Multiple Mixing-Valves, of which the following is a specification.

The invention relates broadly to valves and more specifically to a mixing valve, being intended more particularly for embodiment in faucets for use on wash basins, bathtubs, sinks, coffee urns or the like although it is to be understood that I do not in any way limit the application of the invention to faucets since it may be applied as may be desired to regulate the mixing of separate fluids.

The invention has broadly for an object to provide a combination valve by which the mixing of separate fluids may be regulated.

More specifically the invention has for an object to provide a valve by which two separate fluids, such as hot and cold water, may be mixed, and delivered to a desired point, in predetermined relative proportions.

A further object is to provide a combination valve of this type in which the total volume of liquid delivered to the desired point may be varied at will without affecting the relative proportions, or quality, of the mixture; or the relative proportions may be varied without affecting the total volume.

A further object is to provide a valve of this type which will be of simple and inexpensive construction and of compact form.

For further comprehension of the invention, and of the objects and advantages thereof, reference will be had to the following description and accompanying drawings, the various novel features of the invention being clearly pointed out and set forth in the appended claim.

Figure 1 of the drawings is a plan view of my improved combination faucet.

Fig. 2 is a vertical section thereof.

Fig. 3 is a horizontal section on the line 3—3 of Fig. 2.

In the drawings I have shown my invention embodied in a faucet for controlling the usual hot and cold water pipes leading to bath tubs, wash basins, sinks or the like.

The casing of the faucet is shown at 1 and may be of circular outline in plan view and provided on one side with a pair of bosses 2 and 3 which serve as the means for attaching the faucet to the hot and cold water pipes 4 and 5 through the usual nipples 6 and 7.

These bosses are drilled longitudinally as at 8 and 9 to form passages leading from the pipes 4 and 5 to a central opening in the valve casing in which is seated a hollow plug 10. This plug may be rotatably held in place by means of the nut 11 screwed upon an integral stud 12 projecting downwardly from the plug and through the bottom wall of the casing. The plug 10 is preferably slightly tapered and a split washer 13 may be interposed between the nut and bottom of the casing to cause the plug to be held in proper engagement with the casing.

Formed in the periphery of this plug is a horizontal extending, segmental groove 15 which communicates, by an inlet 16, with the chamber 17 in the plug, this chamber being the mixing chamber of the valve. The groove 15 registers with the inner ends of the inlet passages 8 and 9, being of sufficient length to extend completely across the end of each passage to leave both passages full open at the same time when the groove is centrally disposed with relation to the passages.

Surrounding the plug 10 is an annular chamber 18 formed in the casing 1. The passage 19 through the spout 20 of the faucet leads from this annular chamber 18, while the interior chamber 17 in the plug is in communication therewith through a series of passages 21 leading through the wall of the plug. The plug is provided with a suitable handle 22 for adjustment.

Screwed into the upper end of the plug chamber 17, and thus carried independently of the casing 1, is a second valve plug 23 which may have a knurled head 24, or other suitable handle, for adjustment. The lower end of this plug 23 is in proximity to the inlet 16 to the mixing chamber 17, so that by adjustment of this plug the quantity of liquid passing through the valve may be regulated. This plug may be provided with any suitable stuffing box, or other packing means which I have not considered it necessary to illustrate.

The top of the casing 1 is preferably in the form of a flat disk 27 provided adjacent its edge with a series of indicating marks 28 while the plug 10 carries a pointer 29. There are preferably five marks indicating different "open" positions of the valve which are marked "Cold", "Tepid", "Warm", "Medium hot" and "Hot". There are also preferably two marks indicating "closed" positions of the valve and these are marked "Close".

In the use of my improved valve when it is desired to obtain an equal supply of hot and cold water the handle 22 will be turned until the pointed 29 registers with the mark "Warm" in which position there is an unrestricted flow of water through each of the inlet passages 8 and 9, the two streams being thoroughly mingled in passing through the mixing chamber 17 and out by way of the openings 21.

If it is desired to obtain a relatively large supply of either hot or cold water, or in other words to obtain cooler or warmer water, the handle is moved until the pointer registers with the mark "Medium hot" or the mark "Tepid" as desired. In this position one of the end walls of the segmental groove 15 has moved partially across one of the inlet passages leaving a diminished opening therethrough while the other passage remains completely open. Setting the pointer to the "Hot" or "Cold" mark will result in completely closing the cold water or hot water passage leaving the other passage unobstructed, while the handle may be moved on either side past, the "Hot" and "Cold" positions, to "Closed" position in which the segmental groove 15 has been turned completely away from the inlet passage.

As will be apparent the total volume of flow in any of the open positions may be regulated by turning the head 24 and moving the lower end of the plug valve 23 across the port 16.

In order to insure the use of the main plug in closing the valve instead of the small auxiliary plug, I prefer to arrange the latter to work between certain limits so that it will not completely shut off the stream of water. I do this here by providing a projecting stud 30 on the plug which engages in an annular recess 31 in the main plug.

It will be apparent that many changes and modifications might be made in the construction of my improved valve without departing from the spirit of the invention and the right is reserved to all changes and modifications coming within the intent and meaning of the invention as defined in the appended claim.

What I claim and desire to secure by Letters Patent is as follows:—

A device of the class described comprising a casing containing a vertical bore, a plurality of lateral inlets to said bore, an annular compartment surrounding said bore and an outlet therefrom, a rotatable plug hollowed to provide a mixing chamber, said plug being seated in said bore and having a horizontal slot adapted to wholly or partly communicate said mixing chamber and one or more of said inlets, depending upon the angular position of said plug, a plurality of ports beneath said slot communicating said annular compartment and said mixing chamber, a cock, loosely secured in the top of said plug for controlling the volume of influx into said mixing chamber, projecting downwardly and movable vertically therein, pins protruding from said cock, shoulders in said plug to engage said pins and thereby limit the uppermost and lowermost positions of said cock.

Signed at New York city, World Bldg., in the county of New York and State of New York, this 27th day of March, A. D. 1918.

ABRAHAM ENGEL.

Witness:
GEO. N. VERITZAN.

Copies of this patent may be obtained for five cents each, by addressing the "Commissioner of Patents, Washington, D. C."